US009591839B2

(12) United States Patent
Takamatsu et al.

(10) Patent No.: US 9,591,839 B2
(45) Date of Patent: Mar. 14, 2017

(54) SPINNING REEL FOR FISHING AND A BRAKING OPERATION LEVER FOR THE ROTOR BRAKING DEVICE

(71) Applicant: Shimano Inc., Sakai, Osaka (JP)

(72) Inventors: Takuji Takamatsu, Osaka (JP); Keigo Kitajima, Osaka (JP); Kei Saito, Osaka (JP); Shingo Matsuo, Osaka (JP)

(73) Assignee: Shimano Inc., Osaka (JP)

( * ) Notice: Subject to any disclaimer, the term of this patent is extended or adjusted under 35 U.S.C. 154(b) by 362 days.

(21) Appl. No.: 14/281,268

(22) Filed: May 19, 2014

(65) Prior Publication Data

US 2014/0361110 A1 Dec. 11, 2014

(30) Foreign Application Priority Data

Jun. 5, 2013 (JP) ................................. 2013-118483

(51) Int. Cl.
*A01K 89/01* (2006.01)
*A01K 89/027* (2006.01)

(52) U.S. Cl.
CPC .................................. *A01K 89/027* (2013.01)

(58) Field of Classification Search
CPC .............. A01K 89/027; A01K 89/0275; A01K 89/029; A01K 89/0126; A01K 89/01
See application file for complete search history.

(56) References Cited

U.S. PATENT DOCUMENTS

| | | | | |
|---|---|---|---|---|
| 2,918,227 A | * | 12/1959 | Mauborgne | A01K 89/01 242/243 |
| 2,932,464 A | * | 4/1960 | Mauborgne | A01K 89/027 242/243 |
| 4,470,554 A | * | 9/1984 | Kobayashi | A01K 89/027 242/243 |
| 4,529,142 A | * | 7/1985 | Yoshikawa | A01K 89/027 242/243 |
| 5,240,202 A | * | 8/1993 | Park | A01K 89/027 242/246 |
| 5,697,566 A | * | 12/1997 | Young | A01K 89/0275 242/239 |
| 5,863,007 A | * | 1/1999 | Sato | A01K 89/01 242/249 |

(Continued)

FOREIGN PATENT DOCUMENTS

| | | |
|---|---|---|
| CN | 102210290 A | 10/2011 |
| JP | 2001-128599 A | 5/2001 |
| JP | 2006-129775 A | 5/2006 |

OTHER PUBLICATIONS

European Search Report of corresponding EP Application No. 14 17 1209.1 dated Oct. 7, 2014.

*Primary Examiner* — Emmanuel M Marcelo
(74) *Attorney, Agent, or Firm* — Global IP Couselors

(57) ABSTRACT

A braking operation lever includes a lever main body, an operating section, a brake shoe, and an elastic member. The lever main body has a first end part and a second end part, and is rotatably supported by the reel body. The operating section is configured to cause a braking operation, and is disposed on the first end part of the lever main body. The brake shoe is disposed on the second end part of the lever main body, and is configured to be pressed by the rotor while operating the operating section. The elastic member is disposed between the brake shoe and the lever main body.

15 Claims, 7 Drawing Sheets

(56) References Cited

U.S. PATENT DOCUMENTS

| | | | |
|---|---|---|---|
| 5,988,549 A * | 11/1999 | Hitomi | A01K 89/027 242/243 |
| 6,095,008 A * | 8/2000 | Hitomi | A01K 89/01 242/247 |
| 6,343,418 B1 * | 2/2002 | Hitomi | A01K 89/01 164/98 |
| 2006/0169814 A1 * | 8/2006 | Ikuta | A01K 89/027 242/295 |
| 2006/0266861 A1 * | 11/2006 | Kitajima | A01K 89/01 242/322 |
| 2011/0042500 A1 * | 2/2011 | Saito | A01K 89/01 242/224 |

* cited by examiner

SPINNING REEL FOR FISHING AND A BRAKING OPERATION LEVER FOR THE ROTOR BRAKING DEVICE

CROSS-REFERENCE TO RELATED APPLICATIONS

This application claims priority to Japanese Patent Application No. 2013-118483, filed on Jun. 5, 2013. The entire disclosure of Japanese Patent Application No. 2013-118483 is hereby incorporated herein by reference.

BACKGROUND

Field of Invention

The present invention relates to a spinning reel for fishing and a braking operation lever for a rotor braking device installed on this spinning reel.

Background Information

When performing surf fishing, a lever brake-type spinning reel, shown, for example, in Japanese Laid-Open Patent Publication No. 2006-129775, is often used. This kind of spinning reel comprises a rotor braking device. The rotor braking device is a device that brakes and stops the rotation of the rotor in the line delivering direction (the reverse rotation), and this device is equipped with a brake drum that rotates in conjunction with the rotation of the rotor in the line delivering direction and a braking operation lever for conducting the braking operation of the brake drum (hereinafter referred simply as the "brake lever"). Then, by operating the brake lever, the braking force can be adjusted to a level that will not prevent fish from biting the bait.

More specifically, the brake lever is formed into a circular arch shape, and the center part in the longitudinal direction is pivotally mounted to the reel body. Additionally, an operating section that is disposed close to the fishing pole mounting portion is installed at the tip of the brake lever, and a brake shoe that is pressed against the brake drum is installed at the proximal end of the brake lever. Then, if the operating section of the brake lever is operated in the direction approaching the fishing pole mounting portion, the brake shoe contacts the inner peripheral surface of the brake drum, and the braking force are applied to the reverse rotation of the rotor.

SUMMARY

The brake shoe of the rotor braking device such as that mentioned above is generally made of synthetic resin. In order to achieve a longer life by suppressing wear increasing the rigidity of the brake shoe is preferable. On the other hand, if the rigidity is increased too much, the adjustment range for the braking force becomes narrow, making the ability to delicately control the tension of the fishing line difficult.

The object of the present invention is to suppress the wearing of the brake shoe and expand the adjustment range of the braking force in a rotor braking device of a spinning reel for fishing.

The braking operation lever of the rotor braking device according to the first aspect, of the present invention is capable of stopping the rotation of a rotor and is rotatably supported on a reel body. This braking operation lever comprises a lever main body having a first end part and a second end part, and being rotatably supported by the reel body, an operating section configured to cause a braking operation, and being disposed on the first end part of the lever main body, a brake shoe disposed on the second end part of the lever main body, and being configured to be pressed by the rotor while operating the operating section, and an elastic member disposed between the brake shoe and the lever main body.

With this braking operation lever, by operating the operating section, the lever main body rotates, and the brake shoe disposed on the second end part of the lever main body is pressed against the brake drum of the rotor. With this, the rotation of the rotor is stopped. At this time, the braking force can be adjusted by adjusting the operating force that is applied to the operating section, and the tension of the fishing line can be adjusted.

Here, an elastic member is disposed between the brake shoe and the lever main body, so that, when the braking operation lever is operated and the brake shoe is pressed against the rotor, the elastic member is elastically deformed. With the degree of the deformation of this elastic member, the pressing force of the brake shoe on the rotor can be changed. For this reason, when compared with a conventional configuration, the adjustment range of the braking force can be expanded, and the tension of the fishing line can be delicately controlled.

The braking operation lever of the rotor braking device according to the second aspect of the present invention is configured so that, in the braking operation lever of the first aspect the elastic member is less rigid than the brake shoe. Here, the elastic member is more easily elastically deformed so the adjustment range of the braking force can be expanded, and as mentioned above, the tension of the fishing line can be delicately controlled.

The braking operation lever of the rotor braking device according to the third aspect of the present invention further comprises a deformation restricting mechanism configured to restrict elastic deformation of the elastic member by a predetermined amount, and, subsequent to elastic deformation of the elastic member, the lever being configured to directly transmit the operating force of the operating section from the lever main body to the brake shoe.

Here, when an elastic member is installed between the brake shoe and the lever main body, upon operating the braking operation lever, the elastic member is elastically deformed, and the operating force is absorbed by the elastic member. For this reason, obtaining a large braking force is difficult.

Therefore, here, the device further comprises a deformation restricting mechanism configured to restrict elastic deformation of the elastic member by a predetermined amount, and, subsequent to elastic deformation of the elastic member, the lever being configured to directly transmit the operating force of the operating section from the lever main body to the brake shoe.

Here, after the elastic member is elastically deformed by the predetermined amount, the elastic deformation of the elastic member is restricted. Thereafter, the operating force of the operating section is directly transmitted from the lever main body to the brake shoe. Therefore, even in a case in which an elastic member is disposed between the brake shoe and the lever main body, a large braking force can be obtained.

The braking operation lever of the rotor braking device according to the fourth aspect of the present invention is configured so that, in the braking operation lever of the third aspect, the deformation restricting mechanism is a protrusion disposed so as to protrude from a lever main body side of the brake shoe.

Here, when the braking operation lever is operated and the elastic member is deformed by a predetermined amount, the protrusion disposed on the brake shoe makes contact with the lever main body. Thereafter, the force from the lever main body is directly transmitted to the brake shoe without passing through the elastic member. Therefore, a deformation restricting mechanism can be realized with an extremely simple configuration.

The braking operation lever of the rotor braking device according to the fifth aspect of the present invention is configured so that, in the braking operation lever of the third or the fourth aspect, the deformation restricting mechanism is a protrusion disposed so as to protrude from a brake shoe side of the lever main body.

Here, when the braking operation lever is operated and the elastic member is deformed by a predetermined amount, the protrusion disposed on the lever main body makes contact with the brake shoe. Then, thereafter, the farce from the lever main body is directly transmitted to the brake shoe without passing through the elastic member. Therefore, in the same way as described above, a deformation restricting mechanism can be realized with an extremely simple configuration.

The braking operation lever of the rotor braking device according to the sixth aspect of the present invention is configured so that, in the braking operation lever of any one of the first to the fifth aspects, the elastic member is formed from rubber.

The braking operation lever of the rotor braking device according to the seventh aspect of the present invention is configured so that, in the braking operation lever of any one of the first to the fifth aspects, the elastic member is a plate spring disposed so that, when the brake shoe is pressed against a braking surface of the rotor, the distance between the abutting surface of the brake shoe and the lever main body changes.

The braking operation lever of the rotor braking device according to the eighth aspect of the present invention is configured so that, in the braking operation lever of any one of the first to the seventh aspects, the brake shoe includes a first side and a second side opposite the first side, and comprises an abutting section on the first side and a pair of leg sections disposed on the second side. The abutting section has a first end surface configured to contact the rotor, and is disposed so as to form a gap between the first end surface and the lever main body. The pair of leg sections is configured to engage the lever main body. The elastic member is disposed in the gap.

Here, the brake shoe is integrally engaged with the lever main body by the pair of leg sections, and the end surface of the abutting section makes contact with the rotor to stop the rotor. Then, the elastic member is disposed in a gap that is installed between the abutting section and the lever main body.

The braking operation lever of the rotor braking device according to the ninth aspect of the present invention is configured so that, in the braking operation lever of the eighth aspect, the brake shoe further comprises an elastic member housing section disposed between the abutting section and the pair of leg sections, and a housing space housing the elastic member. The elastic member is detachable from the housing space via only one opening formed in the elastic member housing section.

Here, the elastic member that is housed in the housing space of the elastic member housing section is detached from only one opening of the elastic member housing section.

Therefore, the assembly, etc., of the elastic member becomes easy, and the elastic member does not easily drop out from the housing space after being assembled.

The braking operation lever of the rotor braking device according to the tenth aspect of the present invention is configured so that, in the braking operation lever of the ninth aspect, the one opening of the elastic member housing section is opened in a direction that intersects the rotating direction of the rotor.

Here, the elastic member does not make contact with the rotor directly; however, if the opening of the elastic member housing section is formed on a surface in a direction along the rotating direction of the rotor, there is the risk that the elastic member inside will drop out of this opening.

Therefore, in this invention, the elastic member housing section is configured so that the opening is positioned in a direction that intersects with the rotating direction of the rotor. For this reason, the elastic member becomes less likely to drop out from the internal space of the elastic member housing section.

The spinning reel for fishing according to an eleventh aspect of the present invention comprises a rotor braking device including the braking operation lever according to the first aspect of the present invention, a reel body comprising a fishing pole mounting portion and a leg section extending from the fishing pole mounting portion, and a rotor rotatably mounted to the reel body, the rotor braking device being configured to brake the rotation of the rotor.

The spinning reel for fishing according to a twelfth aspect of the present invention is configured so that, in the spinning reel for fishing of the eleventh aspect, the rotor includes a rotor main body rotatably supported by the reel body, and a brake drum rotatably supported by the reel body, and the brake drum comprises a brake drum main body comprising a braking surface with which the brake shoe is configured to contact, and a one-way clutch configured to transmit only the rotation of the rotor main body in the line delivering direction to the brake drum main body.

As described above, according to the present invention, the wearing of the brake shoe of the braking operation lever installed on the rotor braking device can be suppressed while extending the adjustment range of the braking force.

DETAILED DESCRIPTION OF THE INVENTION

Figure 1:
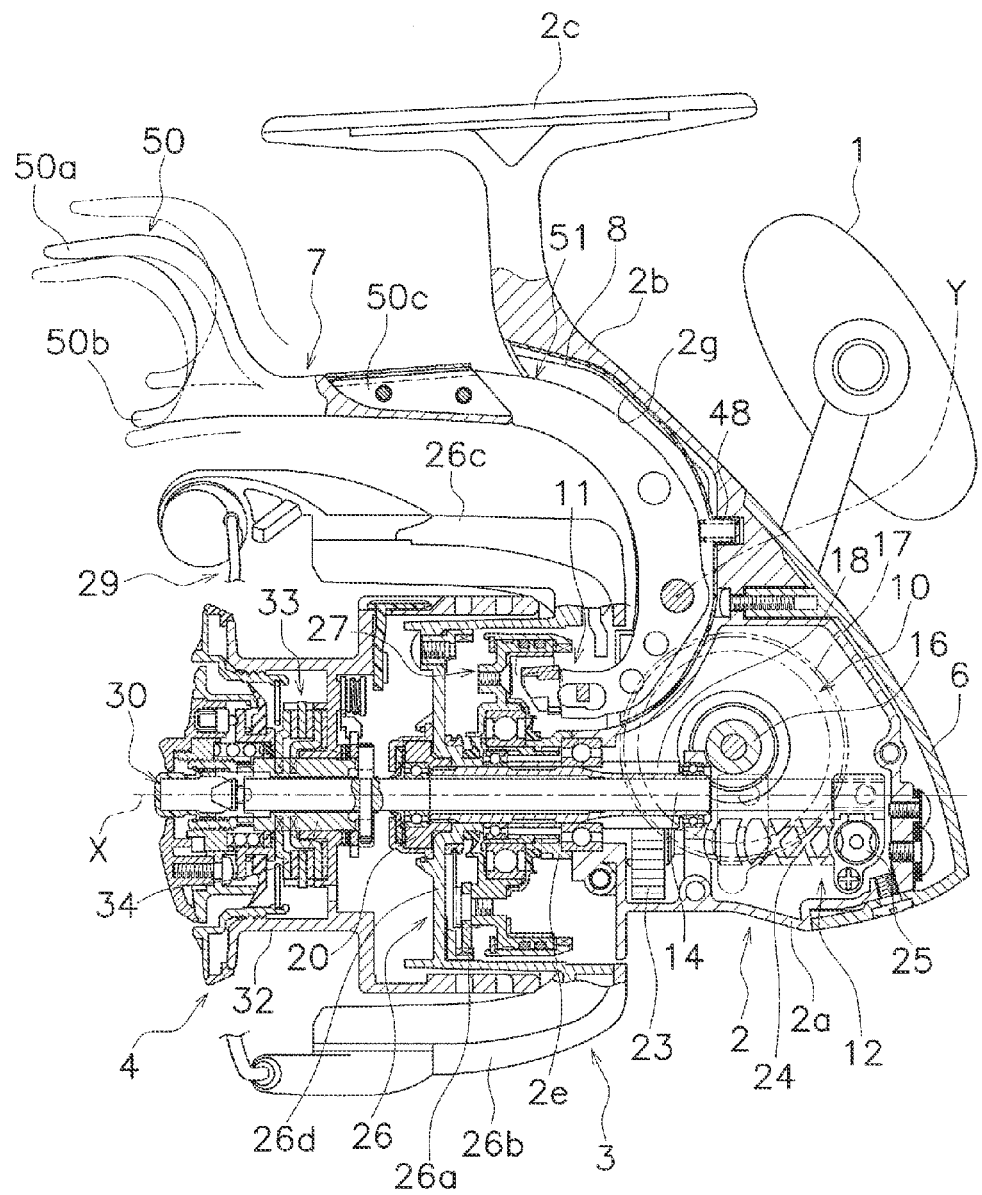
FIG. 1 is a lateral cross-sectional view of a spinning reel according to one embodiment of the present invention.

FIG. 1 shows a spinning reel that employs one embodiment of the present invention. This spinning reel is a lever brake-type reel that winds the fishing reel around a first axis X along the longitudinal direction of the fishing rod. The spinning reel comprises a reel body 2 comprising a handle assembly 1, a rotor 3 that is rotatably supported at the front part of the reel body 2 around the first axis X, and a spool 4 that winds the fishing line disposed at the front part of the rotor 3.

Figure 2:
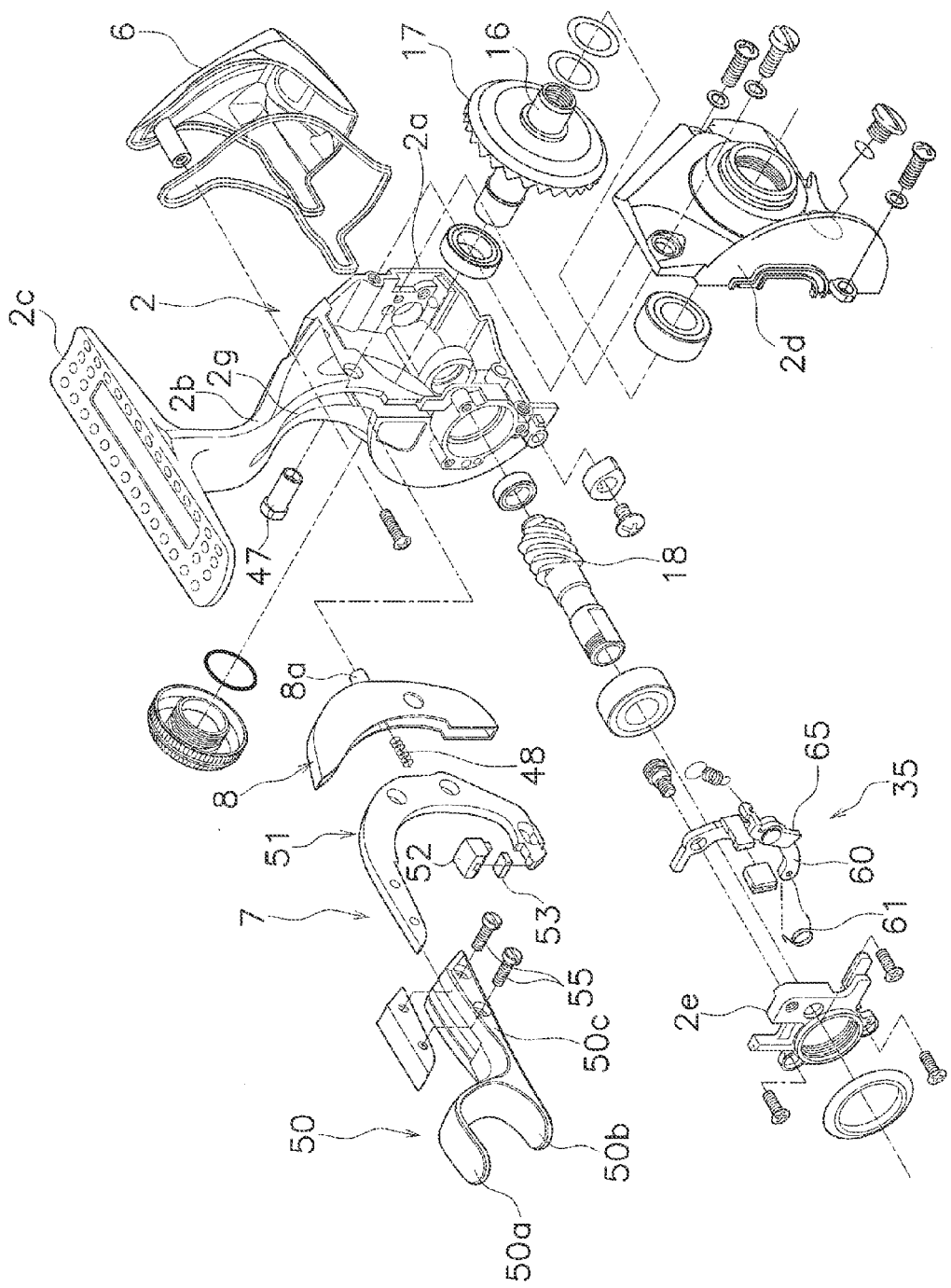
FIG. 2 is an exploded perspective view of a rotor braking device comprising a reel body.

The reel body 2, as shown in FIG. 1 and FIG. 2, comprises a mechanism housing section 2a, a leg section 2b, and a fishing pole mounting portion 2c. The mechanism housing section 2a has a space for mounting each of the mechanisms inside. The mechanism housing section 2a has an opening on one side part, and this opening is closed by a cover member 2d. Additionally, an attaching member 2e is mounted on the front of the mechanism housing section 2a. The leg section 2b is integrally formed with the mechanism housing section 2a and extends from the mechanism housing section 2a toward the fishing pole mounting portion 2c. The fishing pole mounting portion 2c is integrally formed with the leg section 2b at the tip of the leg section 2b and extends longer back and forth.

The rear part of the reel body 2 is covered by a guard member 6. A mounting groove 2g for housing a brake lever 7, as mentioned below, is formed on the front face of the leg section. A sheet member 8 is mounted on the mounting groove 2g.

Inside of the mechanism housing section 2a, as shown in FIG. 1, a rotor drive mechanism 10, a rotor braking device 11, and an oscillating mechanism 12 are installed. The rotor drive mechanism 10 is a mechanism for rotating the rotor 3 in conjunction with the handle assembly 1. The rotor braking device 11 is a device for braking the rotation of the rotor 3 in the line delivering direction (the reverse direction). The oscillating mechanism 12 is a mechanism for reciprocating the spool 4 back and forth via a spool shaft 14 in conjunction with the rotation of the handle assembly 1.

The rotor drive mechanism 10, as shown in FIG. 1 and FIG. 2, comprises a master gear shaft 16 to which the handle assembly 1 is integrally and rotatably fixed, a master gear 17 that rotates along with the master gear shaft 16, and a pinion gear 18 that engages with the master gear 17.

The master gear 16 is integrally formed with the master gear 17 and is rotatably supported in the mechanism housing section 2a and the cover member 2d. The pinion gear 18 is formed in a tube shape, and the front part of the pinion gear extends to the spool 4 side in front of the rotor 3. Additionally, the front part of the pinion gear 18 is integrally and rotatably fixed to the rotor 3 by a nut 20. The tip part, the center part, and the rear part of the pinion gear 18 are each rotatably supported by the mechanism housing section 2a.

The oscillating mechanism 12, as shown in FIG. 1 and FIG. 2, is a traverse cam type that comprises an intermediate gear 23 that engages with the pinion gear 18, a screw shaft 24 that is rotatably mounted to the mechanism housing section 2a around an axis that is parallel with the spool shaft 14, and a slider 25 that moves back and forth with the rotation of the screw shaft 24.

The rotor 3 is rotatably supported by the reel body 2 and comprises a rotor main body 26 and a brake drum 27. The rotor main body 26 comprises a cylindrical section 26a, as well as a first arm section 26b and a second arm section 26c that are installed on the sides of the cylindrical section 26a facing each other. On the front part of the cylindrical section 26a is formed a front wall 26d that has a through-hole in the center. The pinion gear 18 extends through this through-hole that is formed on the front wall 26d. Additionally, as shown in FIG. 1, a bail arm 29 is pivotally installed between the tip of the first arm section 26b and the tip of the second arm section 26c. The fishing line is guided to the spool 4 by this bait arm 29.

The brake drum 27 forms the rotor braking device 11, along with the brake lever 7. This rotor braking device 1 will be described below.

The spool 4 is disposed between the first arm section 26b and the second arm section 26c of the rotor main body 26. The spool 4 is detachably and non-rotatably mounted on the tip of the spool shaft 14 via a one-touch detaching mechanism 30. The spool 4 comprises a spool main body 32, a drag mechanism 33 disposed in the spool main body 32, and a spool tube part 34 that rotatably supports the spool main body 32.

Figure 3:
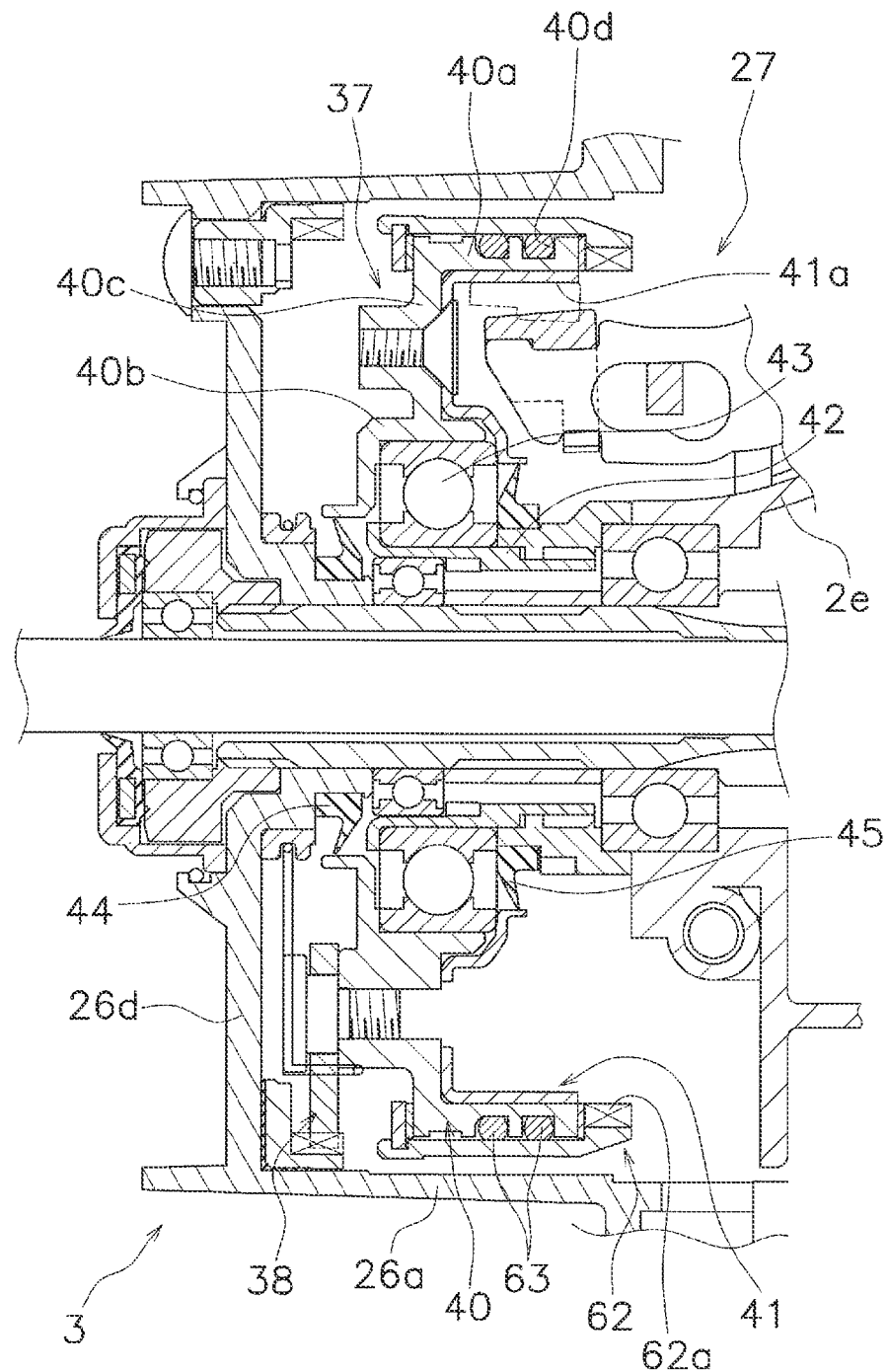
FIG. 3 is a partial cross-sectional view of the rotor braking device.

As shown in FIG. 1 to FIG. 3, the rotor braking device 11 mainly comprises a brake lever 7, a brake drum 27, and a braking control section 35 (refer to FIG. 2). The brake lever 7 is a member for adjusting the braking force of the brake drum 27. The braking control section 35 is a mechanism that enables switching between a braking state in which a predefined braking force is applied and a brake release state in which the brake is released using the brake lever 7.

The brake drum 27, as shown in FIG. 3, comprises a brake drum main body 37 and a one-way clutch 38. The brake drum main body 37 comprises a braking surface 41 that is stopped when the tip of the brake lever 7 is pressed. The one-way clutch 38 couples/disconnects the rotor 3 and the brake drum main body 37 according to the rotational direction of the rotor 3.

The brake drum main body 37 comprises a tubular member 40 that is disposed concentrically with the rotor 3 on the inner circumferential side of a cylindrical section 26a of the rotor 3 and a braking surface 41 that is fixed on the inner circumferential surface of the tubular member 40.

The tubular member 40, as shown in FIG. 3, comprises an outer tube section 40a that is disposed concentrically on the inner circumferential side of the cylindrical section 26a, an inner tube section 40b that is disposed on the inner circumferential side of the outer tube section 40a, and a disc section 40c that couples the outer tube section 40a and the inner tube section 40b. On the outer circumferential surface of the outer tube section 40a is formed a plurality of ring-shaped grooves 40d, to which friction rings of the braking control section 35, mentioned below, are mounted. The inner tube section 40b is rotatably supported by the outer circumferential surface of the axle bearing support member 42 by an axle bearing 43. The axle bearing support member 42 is fixed to an attaching member 2e. Moreover, a sealing member 44 is mounted between the inner tube section 40b and the front wall 26d of the rotor 3.

The braking surface 41 extends from the inner circumferential surface of the outer tube section 40a toward the rear surface of the axle bearing 43 via the inner tube section 40b. The inner circumferential surface along the braking surface 41 is the inner circumferential surface 41a. The braking surface 41 is screwed and fixed to the disc section 40c of the tubular member 40. Moreover, a sealing member 45 is mounted between the inner circumferential edge of the braking surface 41 and the attaching member 2e.

The one-way clutch 38 couples the rotor 3 and the tubular member 40 of the brake drum main body 37 only when the rotor 3 rotates in the line delivering direction and rotates the tubular member 40 in the line delivering direction in conjunction with the rotor 3. Therefore, when the rotor 3 rotates in the line winding direction, the rotor 3 and the tubular member 40 are disconnected, and the rotation is not transmitted from the rotor 3 to the tubular member 40.

As shown in FIG. 1 and FIG. 2, the brake lever 7 is pivotally supported by the reel body 2 around the second axis Y by a support shaft 47 that is mounted to the leg section 2b of the reel body 2. Furthermore, the brake lever 7 is biased in a direction away from the fishing pole mounting portion 2c by a spring member 48.

A mounting groove 2g is formed on the front surface of the leg section 2b, as mentioned above, and a sheet member 8 is mounted to the mounting groove 2g. The sheet member 8, as shown in FIG. 1 and FIG. 2, is a box-shaped member, which is mounted to the mounting groove 2g, and this box-shaped member is crescent shaped from the side view. Additionally a tube-shaped spring housing section 8a is formed on the bottom part of the sheet member 8, and the spring member 48 is housed in this spring housing section 8a. Further, support shaft 47 prevents the sheet member 8 from falling out of the mounting groove 2g.

The brake lever 7 is pivotable between a predefined braking position indicated by the dashed line in FIG. 1 and a braking position indicated by the chain double-dashed line, which is closer to the fishing pole mounting portion 2c than the brake release position. Meanwhile, the brake lever 7 is, normally, retained in either the brake release position indicated by the solid line in FIG. 1 or the predefined braking position indicated by the dashed line by the spring member 48 and the mechanism of the braking control section 35.

The brake lever 7 comprises an operating section 50 for performing a braking operation, a lever main body that is pivotally supported by the mounting groove 2g of the leg section 2b, a brake shoe 52 that is mounted to the tip part of the lever main body 51, and an elastic member 53. The brake shoe 52 is disposed facing the inner circumferential surface 41a of the braking surface 41.

The operating section 50 is detachably coupled to the lever main body 51 by a plurality of bolts 55. The front tip part of the operating section 50 is branched and comprises a pull-out operating section 50a and a first push-in operating section 50b. This section further comprises a second push-in operating section 50c in the part that is coupled with the lever main body 51. The pull-out operating section 50a is used, for example, when a forefinger of the hand that holds the fishing pole (for example, the left hand) conducts a pull-out operation to brake the rotor 3 according to the operating force. Additionally, the first push-in operating section 50b is used when conducting a push-in operation with the forefinger of the hand that holds the fishing pole, and the second push-in operating section 50c is used when conducting a push-in operation with the middle finger of the hand that holds the fishing pole.

More specifically, with the pull-out operation using the pull-out operating section 50a, the brake lever 7 pivots from the brake release position indicated by the solid line in FIG. 1 toward the braking position approaching the fishing pole mounting portion 2c indicated by the chain double-dashed line. Furthermore, with the push-in operation using the first push-in operating section 50b or the second push-in operating section 50c, the brake lever 7 pivots from the brake release position indicated by the solid line toward the predefined braking position away from the fishing pole mounting portion 2c indicated by the dashed line.

Figure 4:
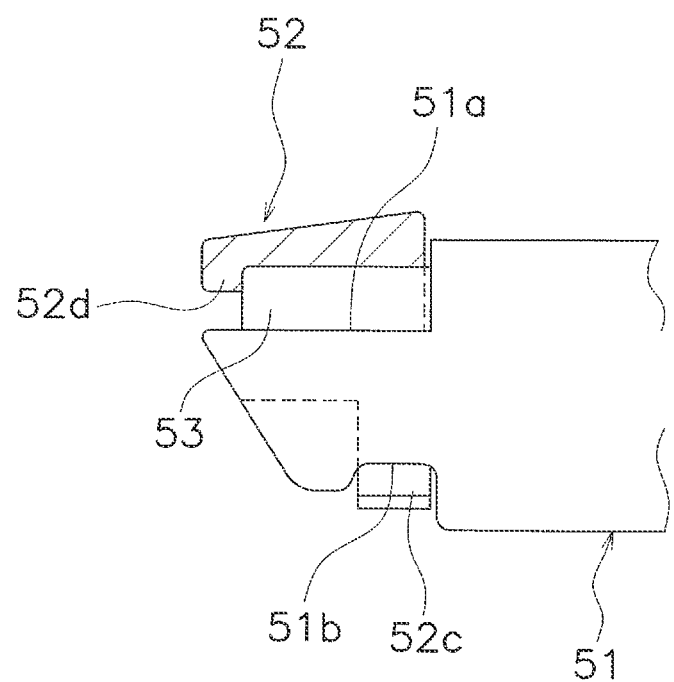
FIG. 4 is a cross-sectional view of the tip of the lever main body.
Figure 5:
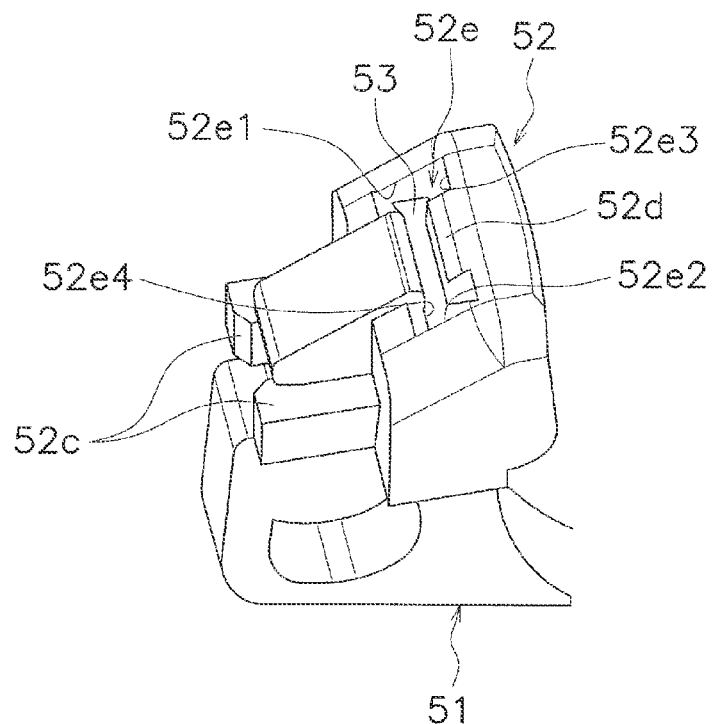
FIG. 5 is an external perspective view of the part shown in FIG. 4.
Figure 6:
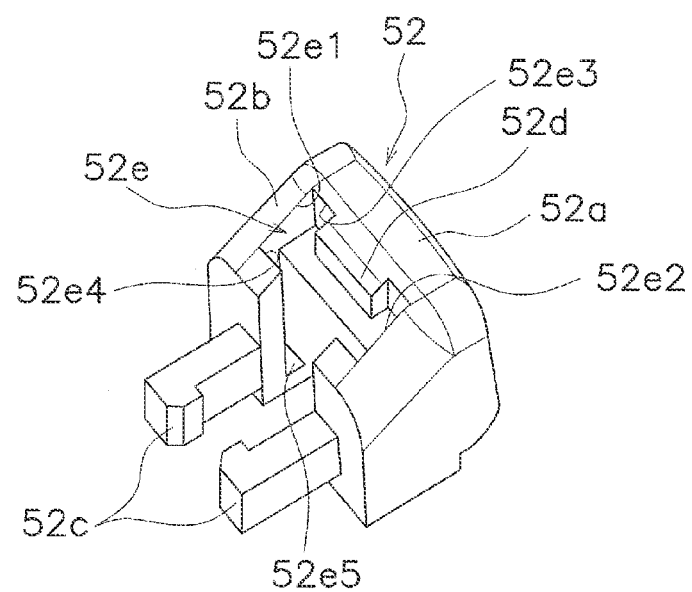
FIG. 6 is an external perspective view of the brake shoe and the elastic member.

FIG. 4 shows a cross-sectional view of the tip part of the lever main body 51. Furthermore, FIG. 5 shows an external perspective view, and FIG. 6 shows an external perspective view in which the brake shoe 52 and the elastic member 53 are pulled out. As shown in these drawings, a brake shoe 52 that makes contact with the inner circumferential surface 41a of the braking surface 41 is detachably attached to the tip part of the lever main body 51. Additionally, an elastic member 53 is disposed between the brake shoe 52 and the lever main body 51.

On the tip of the lever main body 51, a pressing surface 51a is formed on the top part, and an engaging recess 51b is formed on the bottom part.

The brake shoe 52 is made of an elastic synthetic resin, such as a polyamide synthetic resin or polyacetal. The brake shoe 52 comprises an abutting section 52a that makes contact with inner circumferential surface 41a of the braking surface 41, a housing section 52b that houses the elastic member 53, and a pair of leg sections 52c that engage with the engaging recess 51b of the lever main body 51.

The upper surface of the abutting section 52a is pressed to the inner circumferential surface 41a of the braking surface 41. A protrusion (the deformation restricting mechanism) that protrudes to the lever main body 51 side with a predefined width is formed at the tower surface of the abutting section 52a. The protrusion amount of the protrusion 52d is less than the thickness of the elastic member 53 and it is set taking into account the hardness of the elastic member 53 and the necessary braking force.

The housing section 52b is formed on the lever main body 51 side of the abutting section 52a. The housing section 52b comprises a housing space 52e inside of which is housed the elastic member 53. In this housing space 52e, a wall is formed on two surfaces 52e1 and 52e2 of opposing parts (i.e., parts that face each other) in the rotating direction of the rotor 3, as well as one surface 52e3 on the abutting section 52a side, which prevents the elastic member 53 from falling off or popping out of the housing space 52e. Additionally, an opening is formed on the surface 52e4 on the opposite side of the abutting section 52a side of the housing space 52e to which is inserted the tip of the lever main body 51. Furthermore, an opening that is narrower than the width of the elastic member 53 is formed on one surface 52e5 in the direction that is perpendicular to the rotating direction of the rotor 3. Additionally, the other surface in the direction that is perpendicular to the rotating direction of the rotor 3 is opened, and the elastic member 53 is detachable via this surface.

The pair of leg sections 52c is formed extending from the housing section 52b to the opposite side of the abutting section 52a. Furthermore, the tip of the pair of leg sections 52c engages with the engaging recess 51b of the lever main body 51. With this, the brake shoe 52 is fixed to the tip part of the lever main body 51.

The elastic member 53 is installed in the housing section 52b of the brake shoe 52. That is, the elastic member 53 is installed between the abutting section 52a of the brake shoe 52 and the pressing surface 51a of the lever main body 51; here, the elastic member 53 is fixed to the brake shoe 52 by an adhesive agent. The elastic member 53 is made of rubber that is less rigid than the brake shoe 52.

Meanwhile, the brake lever 7, when in a state of not being operated, is biased by the spring member 48; as shown by the solid line in FIG. 1, this lever is disposed in the brake release position. In this state, the brake shoe 52 is away from the braking surface 41.

Figure 7:
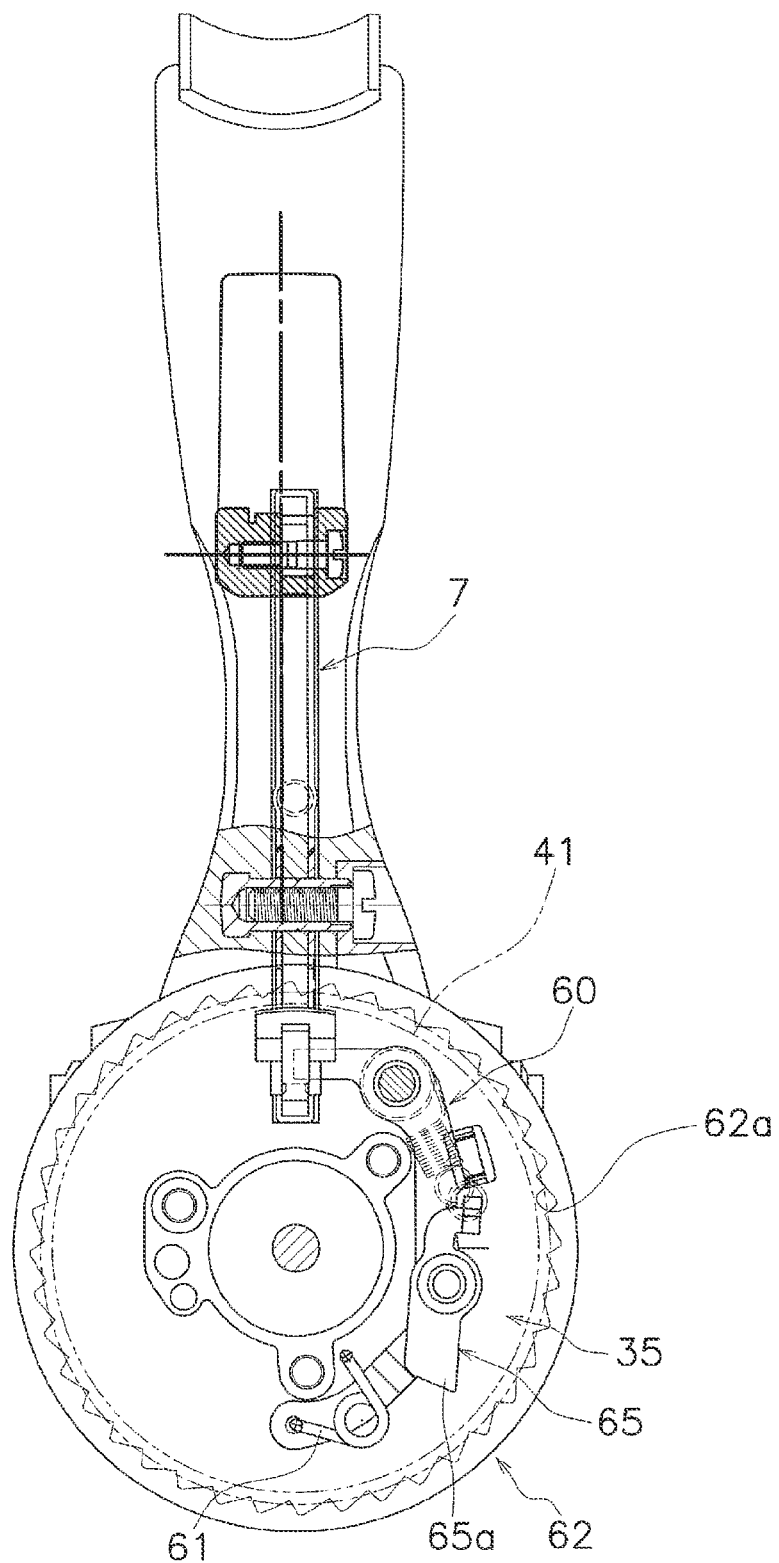
FIG. 7 is a frontal view of the braking control section.

The braking control section 35 comprises, as shown in FIG. 2, FIG. 3, and FIG. 7, a ever member 60 that swings in conjunction with the brake lever 7, a toggle spring 61, a friction member 62, and a friction ring 63. The toggle spring 61 retains the lever member 60 in the brake release position and the predefined braking position. The friction member 62 is rotatably mounted relative to the tubular member 40 and frictionally engages with the tubular member 40. The friction ring 63 consists of, for example, an O-ring and is mounted to each of the two ring-shaped grooves 40d in order to frictionally engage the friction member 62 with the tubular member 40.

The lever member 60 is, as shown in FIG. 2 and FIG. 7, pivotally mounted to the rear surface at the attaching member 2e between the brake release position and the predefined braking position. A locking claw 65 is pivotally mounted to the lever member 60.

The friction member 62 is a tubular member that is rotatably mounted to the outer circumference of the tubular member 40. A serrated section 62a is formed on the inner circumferential surface of one end of the friction member 62 (the right end in FIG. 3) and engages with a claw 65a of the locking claw 65 protruding radially inward. The serrated section 62a is disposed to prohibit the rotation of the friction member 62 in the line delivering direction by engaging with the locking claw 65, when the lever member 60 is in the predefined braking position.

With such a configuration, if the brake lever 7 is pushed in to the predefined braking position, the lever member 60 will swing from the brake release position to the predefined braking position. As a result, the locking claw 65 engages with the serrated section 62a of the friction member 62. In this state, the friction member 62 frictionally slides against the tubular member 40 by the action of the friction ring 63, and the rotation of the rotor 3 in the line delivering direction is stopped in the predefined braking state.

One end of the toggle spring 61 is locked to the proximal end of the lever member 60, and the other end is locked to the front end surface of the mechanism housing section 2a of the reel body 2. Additionally, the toggle spring 61 biases the lever member 60 and biases the brake lever 7 to the predefined braking position and the brake release position and can maintain that position.

When casting, by casting after tilting the bail arm 29 to a line releasing position, the fishing line is released from the outer circumference of the spool 4. When winding the line, if the handle assembly 1 is rotated in the line winding direction, the bail arm 29 is returned to a line winding position by a returning mechanism (not shown). The torque of the handle assembly 1 is transmitted to the pinion gear 18 via a master gear shaft 16 and the master gear 17, and the torque that is transmitted to the pinion gear is transmitted to the rotor 3. At this time, since the rotor 3 rotates in the line winding direction, this torque is not transmitted to the tubular member 40 by the one-way clutch 38. Additionally, with the rotation of the pinion gear 18, the spool shaft 14 reciprocates in the anteroposterior direction.

In a state in which the brake lever 7 is not operated, the brake lever 7 is pressed by the action of the spring member 48 and the braking control section 35 and is disposed to the brake release position or the predefined braking position.

When reversing the rotor 3 to interact with the fish, the braking force is adjusted by pulling out the pull-out operating section 50a of the brake lever 7 from the fishing pole mounting portion 2c with, for example, the forefinger.

When the fishing line is pulled by the fish and the rotor 3 reverses in the line delivering direction, the torque of the rotor 3 is transmitted to the tubular member 40 via the one-way clutch 38 and is further transmitted to the braking surface 41; the rotor braking device 11 is then in a state in which the device can be stopped.

When the rotation of the rotor 3 is transmitted to the tubular member 40 by the one-way clutch 38, the braking surface 41 integrally rotates with the rotor 3. At this time, when the pull-out operating section 50a of the brake lever 7 is pulled out in the direction approaching the fishing pole mounting portion 2c, even if the brake lever 7 is in the predefined braking position, the lever member 60 swings to the brake release position side. As a result, the predefined braking state by the braking control section 35 is temporarily released. At this time, the toggle spring 61 is inverted by the swinging of the lever member 60, and the lever member 60 is biased to the brake release position side and is retained in the brake release position.

When, in this state, the brake lever 7 is operated in the direction approaching the fishing pole mounting portion 2c, the brake shoe 52 of the brake lever 7 strongly presses the inner circumferential surface of the braking surface 41 radially outward. This braking force can be adjusted by increasing or decreasing the force that is applied to the brake lever 7, so that the amount of reverse rotation of the rotor 3 can be freely adjusted. As a result, a braking force that corresponds to the operating force of the brake lever 7 is applied to the rotor 3. In this way, even if one forgets to release the predefined braking state, the predefined braking state can be released by pulling out the brake lever 7.

Here, if the brake lever 7 is operated, the brake shoe 52 is pressed against the inner circumferential surface 41a; at this time, the elastic member 53 that is installed between the lever main body 51 and the abutting section 52a of the brake shoe 52 is elastically deformed. Therefore, the adjustment range of the braking force can be expanded, when compared to a conventional device in which an elastic member is not installed.

Furthermore, if the brake lever 7 is operated with a strong force and the elastic member 53 is elastically deformed by a certain degree, the protrusion 52d that is installed in the abutting section 52a of the brake shoe 52 will make contact with the pressing surface 51a of the lever main body 51. If the brake lever 7 is further operated in this state, the force that is applied to the brake lever 7 is transmitted to the abutting section 52a of the brake shoe 52 directly from the lever main body 51 via the protrusion 52d. Therefore, after the elastic member 53 is elastically deformed by a certain degree, the maximum braking force can be applied to the brake shoe 52.

Additionally, when relocating the fishing spot or housing the reel, the user's hand can be taken off of the pull-out operating section 50a, and either the first push-in operating section 50b or the second push-in operating section 50c is pushed in the direction away from the fishing pole mounting portion 2c. Then, the lever member 60 swings from the brake release position to the predefined braking position, and is retained in that position by the toggle spring 61. As a result, the locking claw 65 engages with the serrated section 62a of the friction member 62, the rotation is prevented, and the reverse rotation of the rotor 3 is prevented.

The braking force at this time is set according to the elastic force of the friction ring 63 that is mounted between the friction member 62 and the tubular member 40. For this reason, even if something hits the handle assembly 1 while moving, a predefined braking force, which is strong enough so that the handle assembly 1 will not rotate, can be easily obtained, and a predefined braking force that is strong enough to prevent line slack while relocating the fishing spot can be set. Furthermore, since swinging occurs due to the relative rotation of the friction member 62 and the tubular member 40, the braking force is less likely to fluctuate and will stabilize.

Additionally, when the rotor 3 is moved from the predefined braking state to the brake release state to change the hanging length of the tackle or to ensure that the fish wilt bite the tackle when fish are present, the brake lever 7 needs only to be operated slightly in the direction approaching the fishing pole mounting portion 2c. Then, as mentioned above, the lever member 60 is swung to the brake release position by the brake lever 7, and the predefined braking state is temporarily released.

An elastic member 53 with low rigidity is disposed between the lever main body 51 and the brake shoe 52, and the elastic member 53 is elastically deformed when the brake lever 7 is operated. According to the degree of this deformation of the elastic member 53, the pressing force against the rotor 3 of the brake shoe 52 can be changed. For this reason, the adjustment range of the braking force can be expanded, and the tension of the fishing line can be delicately controlled.

A protrusion 52d is formed in a part of the brake shoe 52, and the elastic deformation of the elastic member 53 is regulated to a predefined amount by this protrusion 52d. After the elastic member 53 is deformed by a predefined amount, the operating force is directly transmitted from the lever main body 51 to the brake shoe 52. For this reason, even though an elastic member 53 is disposed between the brake shoe 52 and the lever main body 51, a large braking force can be obtained.

The elastic member 53 is disposed in a housing space of the housing section 52b of the brake shoe 52, and is prevented from falling from surfaces other than one side surface. Therefore, assembling the brake shoe, to which the elastic member 53 is mounted, to the lever main body 51 is simple; additionally, after assembly, the elastic member 53 will not easily drop out of the housing space. In particular, since the one surface on which an opening is formed so that the elastic member 53 passes through is positioned in a direction that intersects with the rotating direction of the rotor 3, the elastic member 53 is less likely to drop out of the internal space of the housing section 52b.

The present invention is not limited to the embodiment described above, and various modifications and alterations can be made to the extent that they do not depart from the spirit of the invention.

In the above-described embodiment, the elastic member 53 is fixed to the brake shoe 52 side, but the elastic member 53 can also be fixed to the lever main body 51 side.

In the above-described embodiment, the deformation restricting mechanism is a protrusion 52d that is formed in the abutting section 52a of the brake shoe 52, but the configuration of the deformation restricting mechanism is not limited to this configuration. For example, this mechanism can be configured so that a protrusion is disposed on the lever main body 51 side and so that this protrusion makes contact with the abutting section 52a of the brake shoe 52.

Figure 8:
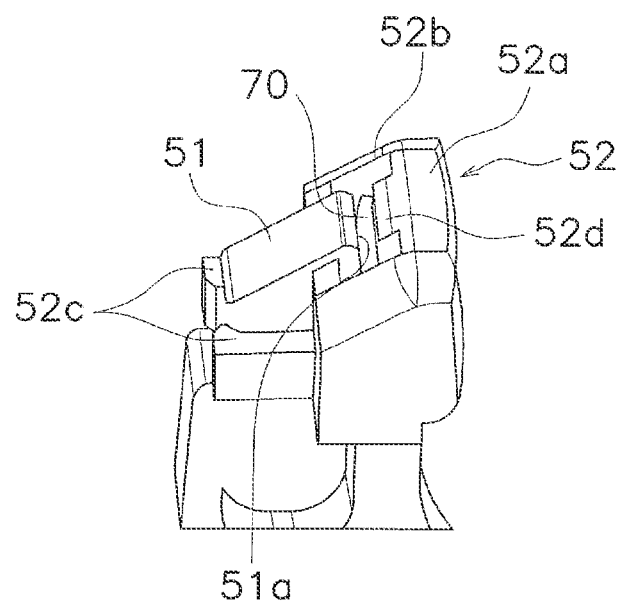
FIG. 8 is a diagram corresponding to FIG. 5 of another embodiment of the present invention.
Figure 9:
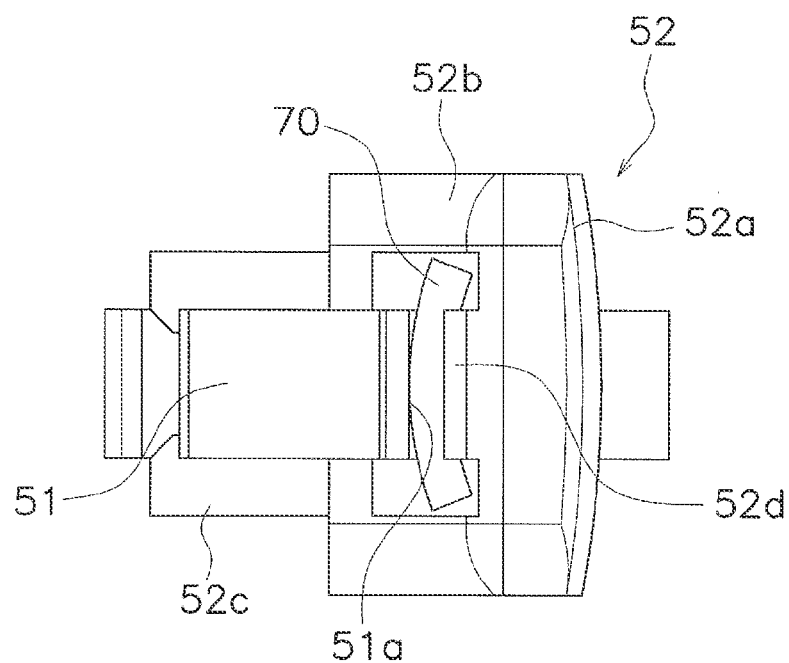
FIG. 9 is a frontal view of the part shown in FIG. 8.

In the above-described embodiment, the elastic member 53 is formed from rubber, but the material, etc., is not limited to this material, and may be any material as long as the elastic member 53 is a member that is less rigid than the brake shoe 52. Other examples of an elastic member are shown in FIG. 8 and FIG. 9. In this example, a plate spring 70 acting as an elastic member is disposed in the housing section 52b of the brake shoe 52. The plate spring 70 is formed extending along the rotational direction of the rotor 3 as well as curving in order to bulge to the lever main body 51 side.

Meanwhile, the shapes, etc., of the brake shoe 52 and the lever main body 51 are the same as in the above-described embodiment. Therefore, the same parts are given the same reference symbols.

Here, when the brake lever 7 is operated, the plate spring 70 is elastically deformed so that the distance between the abutting section 52a of the brake shoe 52 and the pressing surface 51a of the lever main body 51 changes. Even with this kind of configuration, the same effects as those in the above-described embodiment can be obtained.

In the example shown in FIG. 5, the width of the elastic member 53 is formed to be wider than the width of the pressing surface 51a of the lever main body 51, but the width of the elastic member 53 can be the same width as the pressing surface 51a of the lever main body 51. When the widths of the elastic member 53 and the pressing surface 51a of the lever main body 51 are the same, interface damage between the part of the elastic member 53 that contacts the pressing surface 51a and the other parts can be suppressed.

What is claimed is:

1. A braking operation lever for a rotor braking device of a spinning fishing reel is capable of stopping the rotation of a rotor and is rotatably supported on a reel body, the braking operation lever comprising:
   a lever main body having a first end part and a second end part, and being rotatably supported by the reel body;
   an operating section configured to cause a braking operation, and being disposed on the first end part of the lever main body;
   a brake shoe disposed on the second end part of the lever main body, and being configured to press the rotor while operating the operating section; and
   an elastic member disposed between the brake shoe and the lever main body, the elastic member being formed from a material that is less rigid than a material of the brake shoe.

2. The braking operation lever according to claim 1, wherein
   the elastic member is less rigid than the brake shoe.

3. The braking operation lever according to claim 1, further comprising
   a deformation restricting mechanism configured to restrict elastic deformation of the elastic member by a predetermined amount, and, subsequent to elastic deformation of the elastic member, the lever being configured to directly transmit the operating force of the operating section from the lever main body to the brake shoe.

4. The braking operation lever according to claim 3, wherein
   the deformation restricting mechanism is a protrusion disposed so as to protrude from a lever main body side of the brake shoe.

5. The braking operation lever according to claim 3, wherein
   the deformation restricting mechanism is a protrusion disposed so as to protrude from a brake shoe side of the lever main body.

6. The braking operation lever according to claim 1, wherein
   the elastic member is formed from rubber.

7. The braking operation lever according to claim 1, wherein
   the elastic member is a plate spring disposed so that, when the brake shoe is pressed against a braking surface of the rotor, the distance between an abutting surface of the brake shoe and the lever main body changes.

8. A spinning reel for fishing, comprising
   a rotor braking device including the braking operation lever according to claim 1;

a reel body comprising a fishing pole mounting portion and a leg section extending from the fishing pole mounting portion; and a rotor rotatably mounted to the reel body, the rotor braking device being configured to brake the rotation of the rotor.

9. The spinning reel for fishing according to claim 8, wherein the rotor includes a rotor main body rotatably supported by the reel body, and a brake drum rotatably supported by the reel body, and the brake drum comprises a brake drum main body comprising a braking surface with which the brake shoe is configured to contact, and a one-way clutch configured to transmit only the rotation of the rotor main body in the line delivering direction to the brake drum main body.

10. The spinning reel for fishing according to claim 8, further comprising a deformation restricting mechanism configured to restrict elastic deformation of the elastic member by a predetermined amount, and, subsequent to elastic deformation of the elastic member, the lever being configured to directly transmit the operating force of the operating section from the lever main body to the brake shoe.

11. The spinning reel for fishing according to claim 10, wherein the deformation restricting mechanism is a protrusion disposed so as to protrude from a brake shoe side of the lever main body.

12. The spinning reel for fishing according to claim 8, further comprising a deformation restricting mechanism configured to restrict elastic deformation of the elastic member by a predetermined amount, and being a protrusion disposed so as to protrude from a lever main body side of the brake shoe.

13. A braking operation lever for a rotor braking device of a spinning fishing reel is capable of stopping the rotation of a rotor and is rotatably supported on a reel body, the braking operation lever comprising:

a lever main body having a first end part and a second end part, and being rotatably supported by the reel body;

an operating section configured to cause a braking operation, and being disposed on the first end part of the lever main body;

a brake shoe disposed on the second end part of the lever main body, being configured to press the rotor while operating the operating section, and including a first side, a second side opposite the first side, an abutting section on the first side, and a pair of leg sections disposed on the second side, the abutting section having a first end surface configured to contact the rotor, and being disposed so as to form a gap between the first end surface and the lever main body, and the pair of leg sections being configured to engage the lever main body; and an elastic member disposed between the brake shoe and the lever main body, the elastic member being disposed in the gap.

14. The braking operation lever according to claim 13, wherein the brake shoe further comprises an elastic member housing section disposed between the abutting section and the pair of leg sections, and a housing space housing the elastic member, and the elastic member is detachable from the housing space via only one opening formed in the elastic member housing section.

15. The braking operation lever according to claim 14, wherein the one opening of the elastic member housing section is opened in a direction that intersects the rotating direction of the rotor.

\* \* \* \* \*